United States Patent [19]
Trieschmann et al.

[11] 3,917,577
[45] Nov. 4, 1975

[54] CONTINUOUS PRODUCTION OF ETHYLENE HOMOPOLYMERS

[75] Inventors: Hans-Georg Trieschmann, Hambach; Helmut Pfannmueller; Friedrich Urban, both of Limburgerhof; Oskar Buechner; Klaus Steigerwald, both of Ludwigshafen; Wolfgang Ball, Mannheim, all of Germany

[73] Assignee: Badische Anilin- & Soda-Fabrik Aktiengesellschaft, Ludwigshafen (Rhine), Germany

[22] Filed: Aug. 26, 1971

[21] Appl. No.: 175,324

Related U.S. Application Data

[63] Continuation of Ser. No. 858,858, Sept. 17, 1969, abandoned.

[30] Foreign Application Priority Data

Sept. 20, 1968 Germany............................ 1795365

[52] U.S. Cl......................... 260/94.9 R; 260/94.9 P
[51] Int. Cl.$^2$................ C08F 4/34; C08F 10/02; C08F 110/02
[58] Field of Search................... 260/94.9 R, 94.9 P

[56] References Cited
UNITED STATES PATENTS
3,334,081  8/1967  Madgwick et al............ 260/94.9 R

*Primary Examiner*—Joseph L. Schofer
*Assistant Examiner*—A. Holler
*Attorney, Agent, or Firm*—Johnston, Keil, Thompson & Shurtleff

[57] ABSTRACT

A process for the continuous production of ethylene homopolymers by polymerization of ethylene by means of a polymerization initiator and a polymerization regulator at elevated temperature and superatmospheric pressure in a tubular reactor having two or three successive reaction zones, a mixture of ethylene, the polymerization initiator and the polymerization regulator being introduced continuously at the beginning of each reaction zone. It is characteristic of the process according to the invention that special conditions as regards temperature, pressure, polymerization initiator and polymerization regulator are maintained in the individual reaction zones.

1 Claim, No Drawings

CONTINUOUS PRODUCTION OF ETHYLENE HOMOPOLYMERS

This application is a continuation of Ser. No. 858,858, filed 9/17/69, and now abandoned.

The present invention relates to a process for the continuous production of ethylene homopolymers having a density of from 0.923 to 0.927 g/ccm by polymerization of ethylene under the action of a free-radical polymerization initiator and a polymerization regulator at reaction temperatures of from 160° to 350°C and pressures of from 2100 to 4000 atmospheres in a tubular reactor which has two or three successive reaction zones of about the same length, a mixture of ethylene, polymerization initiator and polymerization regulator being initiator and polymerization regulator being introduced into the reactor continuously at the beginning of each reaction zone.

It is known that such multistage processes have the advantage over corresponding single-stage processes that under comparable conditions appreciably higher yields of ethylene homopolymers can be achieved. However, the disadvantage of multistage processes as compared with single-stage processes is that under comparable conditions ethylene homopolymers having a considerably wider molecular weight distribution are formed.

The object of the present invention is to provide a multistage process of the type defined above which does not have the said disadvantage at all or only to a very small extent.

We have found that this object can be achieved (a) by using a polymerization regulator having a specific relativley high C value (with regard to the term "$C_s$ value," cf. G. A. Mortimer, J. Polymer Sci., A-¼, 881/1966) and (b) by adding the polymerization regulator in specific graduated amounts (with reference to the ethylene) to the mixtures of ethylene, polymerization initiator and polymerization regulator which are introduced into the individual reaction zones.

Accordingly, the present invention relates to a process for the continuous production of ethylene homopolymers having a density of from 0.923 to 0.927 g/ccm by polymerization of ethylene under the action of a free-radical polymerization initiator and a polymerization regulator at a reaction temperature of from 160° to 350°C and a pressure of from 2100 to 4000 atmospheres in a tubular reactor having two or three successive reaction zones of about the same length, a mixture of ethylene, polymerization initiator and polymerization regulator being continuously introduced into the reactor at the beginning of each reaction zone, wherein 1. at the beginning of the first reaction zone a mixture is introduced which has a temperature of from 160° to 200°C, which is under a pressure of from 2100 to 4000 atmospheres and which contains per 100 parts by weight of ethylene an amount by weight corresponding to from 2 to 100 mole ppm (with reference to ethylene) of a free-radical polymerization initiator and from 0.3 to 0.7 part by weight of a polymerization regulator having a $C_s$ value of from $1 \times 10^{-2}$ to $4 \times 10^{-1}$;

2. at the beginning of the second reaction zone a mixture is introduced which has a temperature of from 170° to 210°C, which is under a pressure of from 2100 to 4000 atmospheres and which contains per 100 parts by weight of ethylene an amount by weight corresponding to 2 to 100 mole ppm (with reference to ethylene) of a free-radical polymerization initiator and from 40 to 60 percent by weight of the amount of a polymerization regulator having a $C_s$ value of from $1 \times 10^{-2}$ to $4 \times 10^{-1}$ introduced per 100 parts by weight of ethylene into the first reaction zone; and, when there is a third reaction zone, 3. at the beginning of the third reaction zone a mixture is introduced which has a temperature of from 170° 210°C, which is under a pressure of from 2100 to 4000 atmospheres and which contains per 100 parts by weight of ethylene an amount by weight corresponding to 2 to 100 mole ppm (with reference to ethylene) of a free-radical polymerization initiator and from 40 to 60 percent by weight of the amount of a polymerization regulator having a $C_s$ value of from $1 \times 10^{-2}$ to $4 \times 10^{-1}$ introduced per 100 parts by weight of ethylene into the second reaction zone;

with the proviso that the ratio by weight of the mixture introduced per unit time into the first and second reaction zones is from 1:2 to 2:1 and, when there is a third reaction zone, the ratio by weight of the mixture introduced per unit time into the second and third reaction zones is from 1:2 to 2:1.

This process enables ethylene homopolymers having a fairly narrow molecular weight distribution to be prepared in high yields. Ethylene homopolymers prepared according to the invention are moreover distinguished by the fact that they have improved clarity and improved mechanical properties.

Conventional tubular reactors are suitable for carrying out the process, preferably those which have two reaction zones. Provided the above defined special measures are taken into account, the process may be carried out by conventional methods. Further details may for example be found in U.K. Pat. Specification No. 934,444.

The polymerization regulators to be used in accordance with the invention should have $C_s$ values of from $1 \times 10^{-2}$ to $4 \times 10^{-1}$. Specific examples of such polymerization regulators are acetone ($C_s$ value $1.8 \times 10^{-2}$), n-butyraldehyde ($C_s$ value $4.0 \times 10^{-1}$) and cyclohexanone ($C_s$ value $1.1 \times 10^{-1}$). It has been found that propionaldehyde ($C_s$ value $2.5 \times 10^{-1}$) and methyl ethyl ketone ($C_s$ value $2.7 \times 10^{-2}$) are particularly suitable as polymerization regulators.

Ethylene homopolymers obtainable by the process of the invention are particularly suitable for the production of highly transparent films and of mechanically strong packaging film and sheeting.

The invention is illustrated by the following Examples.

EXAMPLE 1

A conventional tubular reactor, jacketed for temperature control, and having two successive reaction zones of equal length is used, the ratio of internal diameter to length being 1:10,000 in the first zone and 1:9,000 in the second zone.

A mixture under a pressure of 2300 atmospheres having a temperature of 175°C and containing 3000 parts by weight of ethylene, 0.25 part by weight of air (the oxygen contained therein acting as a free-radical polymerization initiator, corresponding to 16.8 mole ppm of oxygen with reference to ethylene) and 15 parts by weight of propionaldehyde (polymerization regulator; $C_s$ value = $2.5 \times 10^{-1}$) is introduced continuously per hour at the beginning of the first zone. A maximum reaction temperature of from 300° to 310° is set up (a) by the heat of reaction liberated and (b) the jacket cooling.

A mixture under a pressure of 2300 atmospheres which has s temperature of 175°C and contains 3000 parts by weight of ethylene, 0.25 part by weight of air and 7.5 parts by weight of propionaldehyde is introduced continuously per hour at the beginning of the second zone. The maximum reaction temperature is adjusted to 290° to 300°C.

The ethylene homopolymer obtained at the end of the second zone and the unreacted components of the reaction mixture are introduced by lowering the reactor pressure at intervals to 1900 atmospheres into a separator which is under a presusre of 230 atmospheres.

In this way 1200 parts by weight per hour of ethylene homopolymer is obtained (equivalent to a yield of 20 percent) having an intrinsic viscosity of 1.8 g/10 minutes and a density of 0.925 g/ccm; it also has a relatively narrow molecular weight distribution.

EXAMPLE 2

The procedure of Example 1 is followed, but with the exception that in each reaction zone not 0.25 part by weight of air, but 0.30 part by weight of air (equivalent to 19.2 mole ppm of oxygen with reference to ethylene) is used and that the 15 and 7.5 parts by weight of propionaldehyde are replaced by 45 and 22.5 parts by weight of methyl ethyl ketone ($C_s$ value = $7 \times 10^{-2}$) respectively.

In this way 1260 parts per weight per hour of ethylene homopolymer is obtained having an intrinsic viscosity of 4.2 g/10 minutes and a density of 0.925 g/ccm; its molecular weight distribution is relatively narrow.

We claim:
1. A process for the continuous production of ethylene homopolymers having a density of from 0.923 to 0.927 g/ccm by polymerization of ethylene under the action of a free-radical polymerization initiator and a polymerization regulator at a reaction temperature of from 160° to 350°C and a pressure of from 2100 to 4000 atmospheres in a tubular reactor having two or three successive reaction zones of about the same length, a mixture of ethylene, polymerization initiator and polymerization regulator being continuously introduced into the reactor at the beginning of each reaction zone, wherein
   1. at the beginning of the first reaction zone a mixture is introduced which has a temperature of from 160° to 200°C, which is under a pressure of from 2100 to 4000 atmospheres and which contains ethylene, from 2 to 100 mole ppm (with reference to ethylene) of a free-radical polymerization initiator and from 0.3 to 0.7 parts by weight per 100 parts by weight of ethylene of the polymerization regulator propionaldehyde;
   2. at the beginning of the second reaction zone a mixture is introduced which has a temperature of from 170° to 210°C. which is under a pressure of from 2100 to 4000 atmospheres and which contains ethylene, from 2 to 100 mole ppm (with reference to ethylene) of a free-radical polymerization initiator and from 40 to 60% by weight of the amount of the polymerization regulator propionaldehyde introduced per 100 parts by weight of ethylene into the first reaction zone; and when there is a third reaction zone,
   3. at the beginning of the third reaction zone a mixture is introduced which has a temperature of from 170° to 210°C, which is under a pressure of from 2100 to 4000 atmospheres and which contains ethylene, from 2 to 100 mole ppm (with reference to ethylene) of a free-radical polymerization initiator and from 40 to 60% by weight of the amount of the polymerization regulator propionaldehyde introduced per 100 parts by weight of ethylene into the second reaction zone; with the proviso that the ratio by weight of the mixture introduced per unit time into the first and second reaction zones is from 1:2 and 2:1 and, when there is a third reaction zone, the ratio by weight of the mixture introduced per unit time into the second and third reaction zones is from 1:2 to 2:1.

* * * * *